April 9, 1940.　　W. E. HUMRICHOUSE　　2,196,675
ROTARY MOTOR
Filed June 4, 1937　　3 Sheets-Sheet 1

INVENTOR
Walter E. Humrichouse,
By William Shibler Fowler,
Attorney.

April 9, 1940. W. E. HUMRICHOUSE 2,196,675
ROTARY MOTOR
Filed June 4, 1937 3 Sheets-Sheet 2

Inventor
Walter E. Humrichouse,
By William Shibler Fowler,
Attorney

April 9, 1940.  W. E. HUMRICHOUSE  2,196,675
ROTARY MOTOR
Filed June 4, 1937  3 Sheets-Sheet 3

Inventor
Walter E. Humrichouse,
By William Shibler Fowler,
Attorney

Patented Apr. 9, 1940

2,196,675

UNITED STATES PATENT OFFICE 2,196,675

ROTARY MOTOR

Walter E. Humrichouse, Hagerstown, Md., assignor of one-half to John Charles Ullrich, Hagerstown, Md.

Application June 4, 1937, Serial No. 146,475

17 Claims. (Cl. 123—15)

This invention relates to certain new and useful improvement in rotary motors of a type particularly designed to be operated as an internal combustion motor but also adapted to be operated by other fuel such as vaporized oil, steam, et cetera.

The primary object of the invention resides in the provision of a rotary motor of this type which is simple and practical in construction and operation, composed of the minimum number of operative parts and assures the maximum power and efficiency in operation on the minimum amount of inexpensive fuel.

Another object of the invention resides in the provision of a rotary motor of the character stated which is compact and complete in a single unit in which all four phases of a complete cycle, namely, intake, compression, firing, exhaust, take place within each complete revolution of the shaft.

A further object of the invention resides in the provision of a rotary motor of the type stated, the construction and operation of which assures delivery of the full force of each explosion directly and positively against the piston head to effectively drive the piston in a positive manner, the same as now successfully done in the cases of the highly developed operative and efficient internal combustion motors or engines of the reciprocating piston type.

From the foregoing, it will be seen that the casing sections A and B together with the spacing rings C—C constitute a circular casing wall which entirely surrounds the shaft 22.

The invention has for a further object, the provision of a rotary motor of the type stated in which the stationary casing serving as the stator, carries an inner continuous concentric flange opposite an outer continuous concentric flange to serve as the opposite side walls of the continuous concentric chamber in which operates a special form of arcuate piston extending from one half the circumference of the disk rotor, on one face thereof.

A further object of the invention resides in the provision of special positive lock-heads for opposite piston chambers of the motor unit with hydraulic and also mechanical controlling mechanism for the lock-heads to assume proper co-operation of the lock-heads and positive retention of each lock-head in its locking position at the correct time and for the proper period, during operation of the motor.

A further object of the invention resides in the provision of a quiet and smoothly operating motor in which all of the operative and co-operating parts function without a striking or hammering action of one part against another.

A further object of the invention resides in the provision of a rotary motor in which is assured the drawing in of a generous charge through a strong suction immediately following a partial vaccum in the piston chamber or cylinder, then a positive driving and steady compression of this generous charge in the compression chamber and firing of the charge at the instant of the maximum compression thereof and thereby obtaining full benefit of thorough compression and instant ignition of such generous charge on each revolution of the motor shaft.

A further object of the invention resides in the provision of a rotary motor of the type stated having a water chamber located within the central portion of the structure and between opposed piston chambers or cylinders for constant circulation of water or another suitable medium through the heart of the motor and thus assure constant cooling of the interior of the motor and in co-operation with appropriate means for cooling the exterior of the motor thereby give double assurance against overheating of the motor during operation thereof.

A further object of the invention resides in the provision of a rotary motor of the type stated having all of its parts constructed and arranged in such a manner that constant oiling or lubrication of all operative parts and those cooperating therewith, as required, is assured by suction created during operation of the motor and all friction and tendencies toward resistance to operation and free, efficient functioning of the several movable parts of the motor reduced to the minimum.

A further object of the invention resides in the provision of a rotary motor of the type stated which utilizes the exhaust for heating and further vaporizing each charge as it passes from the carburetter into the piston chamber or cylinder so that the motor always receives hot and thoroughly vaporized charges for compression.

A further object of the invention resides in the provision of a rotary motor of the type stated which may be readily and inexpensively manufactured in independent complete units each of which may be carried on the same shaft and arranged for firing at a different period in each revolution of the shaft, each unit being adapted to be brought into driving operation independently of or in conjunction with the other unit or units or permitted to idle on the shaft, as desired.

A further object of the invention resides in the provision of a rotary motor of the type stated in which the opposite sides or halves of each unit are identical in structure and opposed to one another when assembled with their channelled sides outwardly to accommodate the rotors and arcuate pistons and finally receive the outer side plates, the bolts for which also pass through the outer spacing ring employed between said sides or halves and which ring, together with an inner spacing ring and the backs of the sides or halves of the unit, serve to form the inner water chamber of the unit.

A further object of the invention resides in the provision of a rotary motor in which even the arcuate pistons for the opposite sides or halves of the unit are identical in construction and are opposed to one another in reversed relation and in operation they slide or glide over the respective ends of the compression chamber, closing said respective ends alternately, during each revolution of the shaft.

A further object of the invention resides in the provision of a rotary motor of the type stated which is as far as possible carbon free and which has a complete and clean exhaust of all spent gasses without possibility of back lash and mixing of expended charges with fresh charges and consequent manufacture and expulsion of carbonmonoxide.

Other objects of the invention will appear in the following detailed description, taken in connection with the accompanying drawings, forming a part of this specification, and in which drawings.

Figure 3:
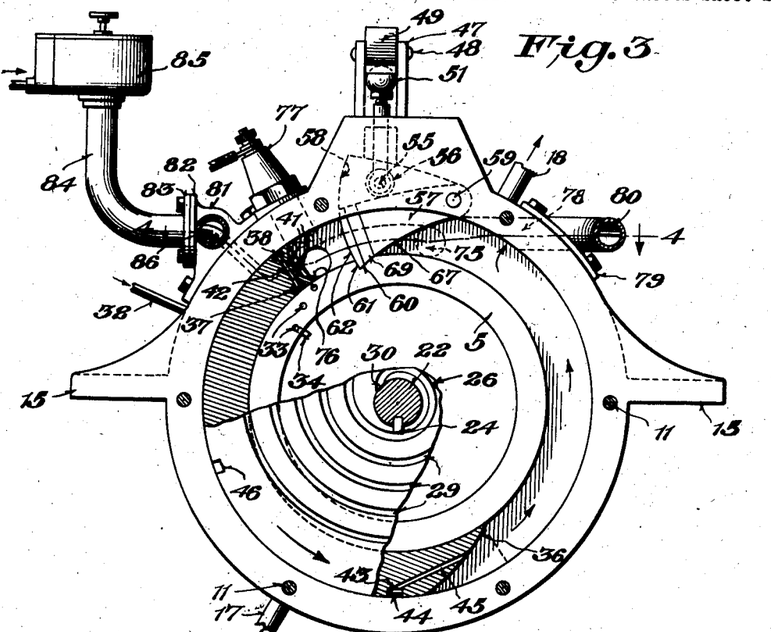
Figure 3 is a side elevation, looking at the reverse side of the motor with the outer side plate or cover plate removed, parts broken away and parts in section and showing the arcuate exhaust expelling piston in position for the firing of the highly compressed charge directly opposite the piston head.
Figures 4, 5:
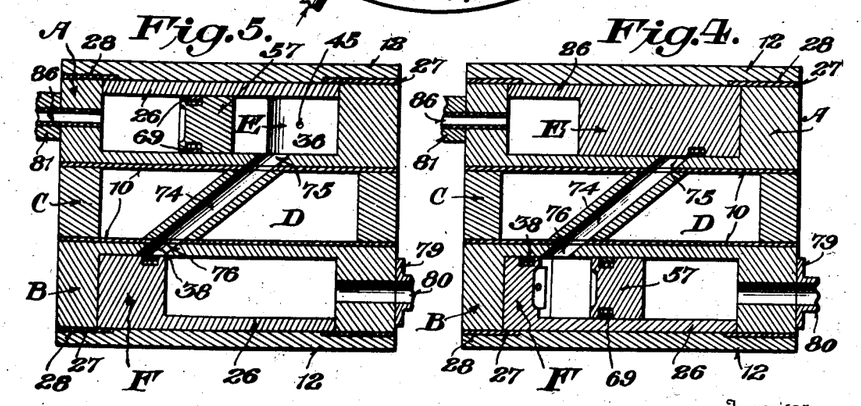
Figure 4 is a transverse section through the motor, taken substantially on the plane of line 4—4 of Figure 3, looking in the direction indicated by the arrows, to show the position of movable parts in both sides of the motor at the period of firing of a charge.
Figure 5 is a view similar to Figure 4, showing the relative positions of the same movable parts at the period of the approach of the arcuate charge compressing piston to the entrance end of the compression chamber to pass over and close the said entrance end just previous to actuating the co-operative lock-heads.

Referring more particularly to the drawings, wherein like characters indicate like and corresponding parts throughout the several views, and wherein a complete unit of the rotary motor is disclosed, it is to be noted that the unit includes a stationary casing stator composed of outwardly turned casing side sections A and B spaced apart by a pair of central spacing rings C—C interposed therebetween, one within the other and thus providing a central motor cooling water chamber D of continuous circular form between said spacing rings C—C and also between said outwardly turned casing side sections A and B, where cooling of the rotary motor is essential and will be most effective, as will be later clearly apparent. The outwardly turned casing side sections A and B are identical in construction, each having a continuous inner annular flange 5 and a slightly deeper continuous outer annular flange 6, thus providing a continuous circular piston accommodating chamber 7 or cylinder in each of said side sections A and B, with the flanges 5 and 6 serving as the side walls thereof. The inner or smaller spacing ring C is in alignment with the inner annular flanges 5 and retained in position by dowels 8 or other appropriate means. It is also obvious that washers 9 are employed between the inner or smaller spacing ring C and the side sections A and B and likewise, washers 10 are employed between the outer or larger spacing ring C and the side sections A and B. The outer or larger spacing ring C is in alignment with the outer annular flanges 6 and retained in such position by the bolts 11 passing therethrough and through the washers 10 and the outer annular flanges 6 and extending beyond the latter to receive the removable, stationary side cover plates 12 of the stator and finally the lock nuts 13. Connecting web members or spokes 14 or other appropriate connections may be employed between the spacing rings C—C and they may be thus produced together, as a single casting, if desired. The side sections A and B also, may be castings and the cost and labor of production thus held to the minimum. For the purpose of mounting the stator on a motor vehicle chassis, aeroplane frame or the like, diametrically opposite radiating lugs 15, provided on the outer peripheries of the side sections A and B and the outer or larger spacing ring C, with mounting bolt accommodating openings 16 therethrough. These lugs may be of the formed arrangement shown in Figures 1 to 3, inclusive and firmly united in sets for solid mounting of the motor or the lugs and even the entire means and method of mounting the motor may be varied, as desired. The water or other motor cooling fluid employed may be fed to the central motor cooling water chamber D by means of the cooling fluid feed pipe 17 entering said central motor cooling water chamber D through the lower portion of the outer or larger spacing ring C and the cooling fluid discharged from said central motor cooling water chamber D by way of the discharge pipe 18 extended through the upper portion of said outer or larger spacing ring C, preferably at a point diametrically opposite the feed pipe 17, as shown in the drawings, particularly Figures 1 and 3.

Outwardly directed central hubs 19 of the removable, stationary side cover plates 12 have inturned annular flanges at their outer ends, designated 20 and within said hubs 19 are retained suitable conventional roller bearings 21 for the rotary shaft 22 of the motor with an appropriate balance wheel 23 locked thereon in any approved manner.

Rigidly mounted on the rotary shaft 22, inwardly of the removable, stationary side cover plates 12, as by means of the keys 24 are the central hubs 25 of the disk rotors 26 which rotate between the said removable, stationary side cover plates 12 and the respective outwardly turned casing side sections A and B to which the side removable, stationary side cover plates 12 are attached. The disk rotors 26 are opposed to one another and ride against the outer faces of the continuous inner annular flanges 5 of the respective outwardly turned casing side sections A and B and against the inner faces of the said removable, stationary side cover plates 12 and also against portions of the washers 27 carried in the annular recesses 28 provided therefor in the inner faces of said removable, stationary side cover plates 12 and engaging the outer faces of the continuous outer annular flanges 6, the diameter of the disk rotors 26 being such that their peripheries stop short of and ride against the inner faces of said continuous outer annular flanges 6 serving as the outer side walls of the continuous circular piston accommodating chambers 7. To assure thorough lubrication of the disk rotors 26 and the motor rotary shaft 22 and thus reduce friction and wear to the minimum, the disk rotors 26 are provided with spiral oil grooves 29 in their outer faces with the inner ends 30 of said spiral grooves 29 turned and terminating at the motor rotary shaft 22, the free outer ends 31 of said spiral grooves 29 terminating inwardly of the peripheries of said disk rotors 26 and serving to gather the lubricant from an appropriate lubricant feed pipe 32 by suction, as required, during the operation of the rotary motor. The opposite faces of the disk rotors 26, riding against the outer faces of the flanges 5, receive proper lubrication during operation of the motor by a lubricant fed thereto through feed passages 33 in said flanges 5 and receiving the lubricant from a suitable source of supply, as indicated at 34 in Figure 1.

Figures 6, 7, 8, 9:
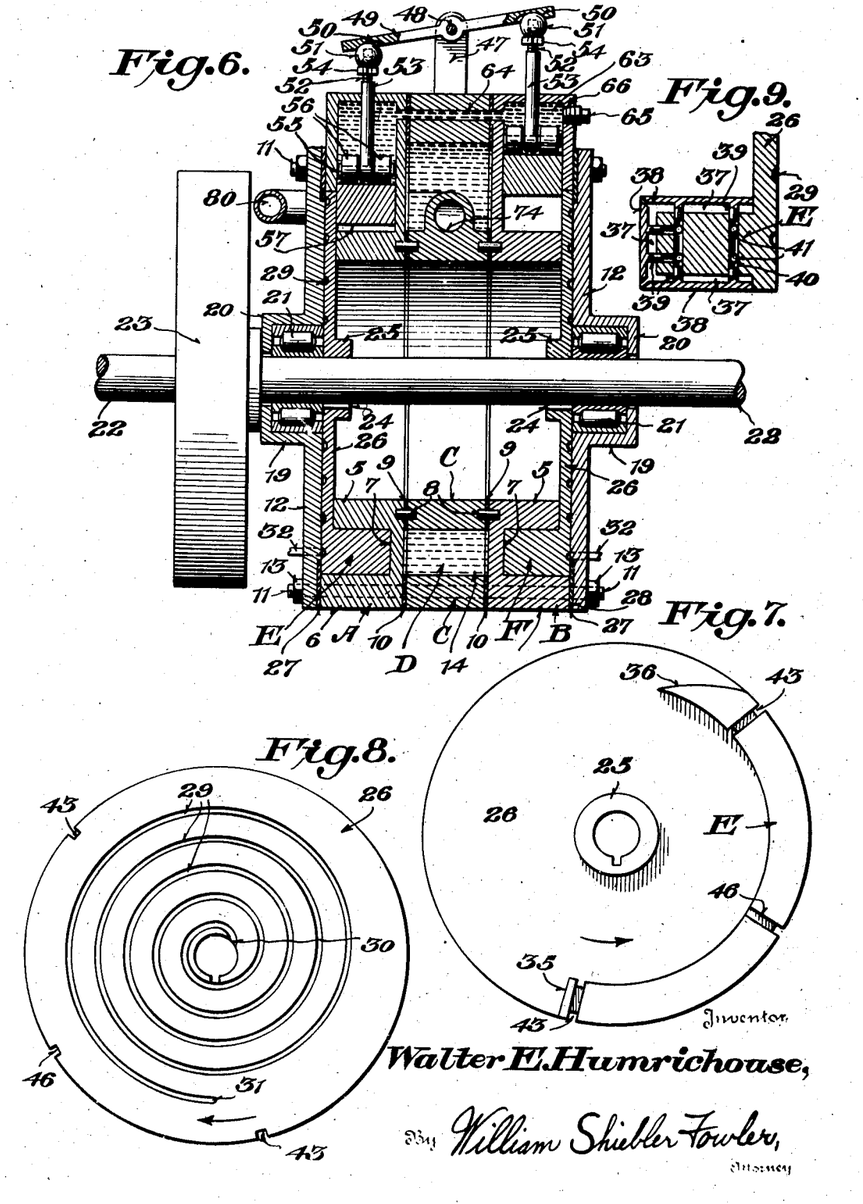
Figure 6 is a vertical transverse section through the motor, taken substantially on the plane of line 6—6 of Figure 1.
Figure 7 is a detail elevation of the disk rotor, looking at the inner face thereof carrying the arcuate piston.
Figure 8 is an elevation of the reverse side thereof, showing the spiral oil suction groove provided therein.
Figure 9 is an enlarged detail section through the piston, taken substantially on the plane of line 9—9 of Figure 1.

An arcuate piston E of rectangular form in cross section is formed on the inner face of one of the disk rotors 26 and extended thereon for approximately one half the circumference of said disk rotor 26 and adapted for operation in the continuous circular piston chamber 7 in the casing side section A of the rotor. The other disk rotor carries on its inner face an identical arcuate piston F which is likewise adapted for operation in the continuous circular piston chamber 7 in the casing side section B and when the disk rotors 26 are keyed on the motor shaft 22 in opposed relation with one of the disk rotors 26 given a half revolution with respect to the other disk rotor, the arcuate pistons E and F then engage in their respective continuous circular piston chambers 7 in correct relative relation to one another for continuous travel in the same direction and which will make them appear to follow one another, as if they rotated in the same chamber, as will be readily understood from Figures 1 and 3 of the drawings. Each of the arcuate pistons E and F has one end flattened to form a flat head 35 while its other end has one face beveled on a wide arc to form a tapering tail 36, as clearly shown in Figure 7 and the purposes of which will later be apparent. The arcuate pistons E and F are further provided with piston ring grooves 37 in three of their faces, near their respective flat heads 35 to accommodate piston ring sections 38 having studs 39 projecting from their inner faces and sliding in the sockets 40 provided therefor in the arcuate pistons and in turn communicating with passages 41 extending inwardly from the central recess 42 provided in the flat heads 35 of said arcuate pistons E and F. Thus, during operation of the rotary motor the piston ring sections 38 will be forced outwardly against the walls of the piston chambers 7 by pressure against the studs 39, from the charge in one of the piston chambers 7 and the exhaust in the other piston chamber 7. Piston ring accommodating grooves 43 are also provided in the faces of the arcuate pistons E and F, near the tapering tails 36 thereof to accommodate piston ring sections 44, similar to the piston ring sections 38 and functioning in a like manner, passages 45 from the grooves 43 opening out onto the beveled or curved faces of the tapering tails 36 of said arcuate pistons E and F, near the centers thereof. Oil grooves 46 also are provided in the walls or faces of the arcuate pistons E and F, intermediate the ends thereof to provide for efficient lubrication of the faces of the arcuate pistons E and F and the walls of the piston chambers 7, at all times during operation of the rotary motor.

The stationary casing stator has a transverse raised central portion G formed by extending upwardly portions of the casing side sections A and B and the outer central spacing ring C. See Figures 1 to 3, inclusive. Rising from this transverse raised central portion G are the standards 47 having journaled therein the rod 48 on which is centrally mounted the rock arm 49, between said standards 47. The rock arm 49 extends transversely of the stationary casing stator and has elongated recesses 50 in its under face, near its opposite ends, in which engage the spherical members 51 adjustable on the threaded upper extremities 52 of the lock head actuating rods 53 and retained in adjusted position on said lock head actuating rods 53 by lock nuts 54 or the like. Carried in the lower ends of the lock head actuating rods 53, within the upward extensions of said casing side sections A and B, are small shafts 55 with a roller on either end and designated by the character 56, the lock head actuating rods 53 operating through the upper walls of the said transverse raised central portion G of the stationary casing stator. The pairs of rollers 56 constantly rest on and ride upon the upper, slightly curved faces of elongated pivoted lock heads 57 operating in pockets 58 which just accommodate them, in the said upwardly extended portions of the respective side casing sections A and B. When in their uppermost positions, the lock heads 57 are entirely within their respective pockets 58, in which they are pivoted on appropriate pivots 59 located transversely in the small ends of said pockets 58 but, when in their lowermost positions, the lock heads 57 intersect the respective piston chambers and complete angular lower edges 60 thereof firmly and securely lock in deep transverse, substantially V-shaped channels 61 in the continuous inner annular flanges 5 and extending the entire width thereof. When a lock head 57 is in this position of intersecting the piston chamber 7 into which it operates, the convex head 62 of said lock head is presented opposite to the head 35 of the piston E or F, as the case may be, operating in the same piston chamber 7. In addition to being identical to one another, the lock heads 57 also raise and lower alternately, one being up while the other is down and vice versa. This reverse movement of the lock heads 57, in unison, is due to the constant riding of the rollers 56 thereon and th. described operative connections between the two sets or pairs of rollers 56. Efficient and smooth operation of the lock heads 57 as stated, is further assured by use of a stiff oil 63 or the like within the raised portions of the casing side sections A and B, above the said lock heads 57 and passing back and forth between the said casing side sections A and B by way of the communicating passage 64 through the raised portion of the outer central spacing ring C and the corresponding portions of the washers 10. The closure plug 65 is secured in the opening 66 in the upper or raised portion of one of the casing side sections A or B, after the stiff oil has been supplied thereto. As the maximum amount of stiff oil is maintained in the entire space above both lock heads and within the communicating passage 64, at all times, it will therefore, be evident that the lock heads are always under hydraulic control as well as mechanical control, during operation of the rotary motor. In order that the lock heads 57 may operate smoothly at all times while changing from one position to another, their lower faces 67 are curved longitudinally on a greater angle than their upper faces and at a degree substantially corresponding to the curvature of the piston tails 36. Such curvatures of these faces, together with the location of the pivots 59 for the lock heads 57 and the arcs in which said lock heads operate, with respect to the circles in which the pistons E and F travel while operating in their respective piston chambers or cylinders 7, assure a smooth, gradual sliding ar gliding engagement of the piston tails 36 with and riding along the said lower faces 67 of the respective lock heads 57, to raise the latter steadily and smoothly, on each revolution of the rotary shaft 22 and render absolutely impossible any striking or hammering of the pistons E and F against the lock heads 57 or sudden, jerky, convulsive movements of the lock heads 57 as the pistons E and F engage therewith. In the opposite side walls of the lock heads 57 are provided grooves 68 which accommodate piston ring sections 69 having studs 70 projecting from their inner faces and working in the ends of transverse passages 71 in said lock heads 57, with which communicate passages 72 extending inwardly from the central recess 73 provided in the convex heads 62 of said lock heads 57. Thus, it will be evident that any charge or exhaust gases between a piston head 35 and the head 62 of a lock head 57 when the latter is within the piston chamber 7, will have an outwardly forcing effect on the studs 70 and cause the piston ring sections 69 to form a positive gas seal at the sides of the lock head 57, without interfering with the efficient operation of the rotary motor.

A charge compression chamber 74 extends at a sharp angle through the water chamber D and is carried on the upper face of the inner or smaller spacing ring C, preferably in the form of a short pipe having a rather large diameter and cast or otherwise formed with said inner or smaller spacing ring C, the angular position of the charge compression chamber 74 being with respect to the longitudinal axis of the rotary shaft 22 of the rotary motor. The inlet opening or inlet end 75 of the charge compression chamber 74 is provided in the main wall of the outwardly turned casing side section A beneath the lock head 57 operating therein and just rearwardly of the longitudinal center of the latter, toward the pivoted end of said lock head 57 and near the continuous inner annular flange 5. Thus, the inlet opening or inlet end 75 of the charge compression chamber 74 is covered over and closed by the tail end or tapering tail 36 of the arcuate piston E gradually as it passes over the same just previous to arriving at and sliding into engagement with the longitudinally curved lower face 67 of said lock head 57. The outlet or discharge end 76 of the charge compression chamber 74 is provided in the main wall of the outwardly turned casing side section B, a short distance forwardly of the convex head 62 of the lock head 57 operating in said outwardly turned casing side section B, at a point just below the spark-plug 77 removably secured in an approved manner in the continuous outer annular flange 6 of the said outwardly turned casing side section B, the outlet or discharge end 76 of the charge compression chamber 74 opening into the circular piston accommodating chamber 7, adjacent to the continuous inner annular flange 5. The spark plug 77 is located on the upper side of the stator near the transverse raised central portion G thereof and near the other side of the transverse raised central portion G. An exhaust port 78 is provided through the same continuous outer annular flange 6, in such a position as to assure discharge of all spent gases therethrough by the tapering tail 36 of the arcuate piston F just previous to sliding engagement of the said tapering tail 36 with the longitudinally curved lower face 67 of the lock head 57 working therewith while in its lowermost position and locked in such position in the piston chamber 7 of the casing side section B and simultaneous closing of the inner end of the exhaust port 78 by the arcuate piston F. This complete exhaustion of spent gases is assured by the location and direction of the exhaust port, it being positioned opposite the longitudinally curved lower face 67 of the lock head 57 and directed outwardly therefrom, just below the transverse raised central portion G. Secured to the outer face of the continuous outer annular flange 6 of the outwardly turned casing side section B by appropriate means is the flanged end 79 of the exhaust pipe 80, suitably turned and crossed over the stator and through a casting 81 appropriately mounted on the outer face of the outwardly turned casing side section A, at a point nearly opposite the spark plug 77. This casting 81 has a flange 82 to which is attached in a suitable manner the complementary flange 83 of the carburetter supporting pipe 84 with an efficient carburetter 85 mounted thereon. The charge feed pipe 86 from the carburetter 85 descends through the carburetter supporting pipe 84 and passes through the portion of the exhaust pipe 80 held in the casting 81 and then terminates in the charge intake port 87 in the said continuous outer annular flange 6, to deliver the charges of combustible gases to the circular piston accommodating chamber 7 in the outwardly turned casing side section A, at a point a short distance ahead of the locked position of the lock head 57 for said circular piston accommodating chamber 7, whereby this chamber serves as the charge intake and charge compressing cylinder of the rotary motor, while the other circular piston accommodating chamber 7 in the outwardly turned casing side section B serves as the expansion or power and exhausting cylinder of the rotary motor.

From the foregoing paragraphs taken in connection with the accompanying drawings, it will be clearly apparent that I have provided a rotary motor which is of such construction that all of the parts thereof may be readily manufactured at low cost and easily assembled with the minimum expenditure of both time and labor for efficient operation of the rotary motor for production of the maximum power from the minimum amount of any one of several inexpensive fuels, the operative parts all being automatically lubricated through operation of the rotary motor, with these few parts so constructed and arranged as to practically eliminate danger of excessive stress thereon and resultant rapid wear thereof. Furthermore, it is obvious that the importance of the inner annular flanges 5 serving as the inner side walls of the continuous circular piston accommodating chambers 7 or cylinders can not be overestimated, as they are essential features required to render this type of rotary motor practical and operative. It is also obvious that the structure produced by my special combination and arrangement of co-operating elements assuring smooth travel of the arcuate pistons E and F in circles concentrically of and with the rotary power shaft 22, and thus eliminating all possibility of thrusts toward and strains and stresses on said rotary power shaft 22, as the power shafts of the various types of motors and engines heretofore produced are subjected to, is of utmost importance. This structure, which I have disclosed, with the continuous circular water chamber D in the center or heart of the rotary motor, where it is most needed, is much more effective in preventing overheating of the rotary motor while operating than in the case of the various types of motors and engines now in general use and which, due to their construction, make it impossible to locate a water chamber anywhere other than on the outer portion of motor or engine. Many other important and valuable differences in both the construction and the operation of this rotary motor, over all previous and present types of motors and engines will be obvious.

Figures 1, 2, 10, 11:
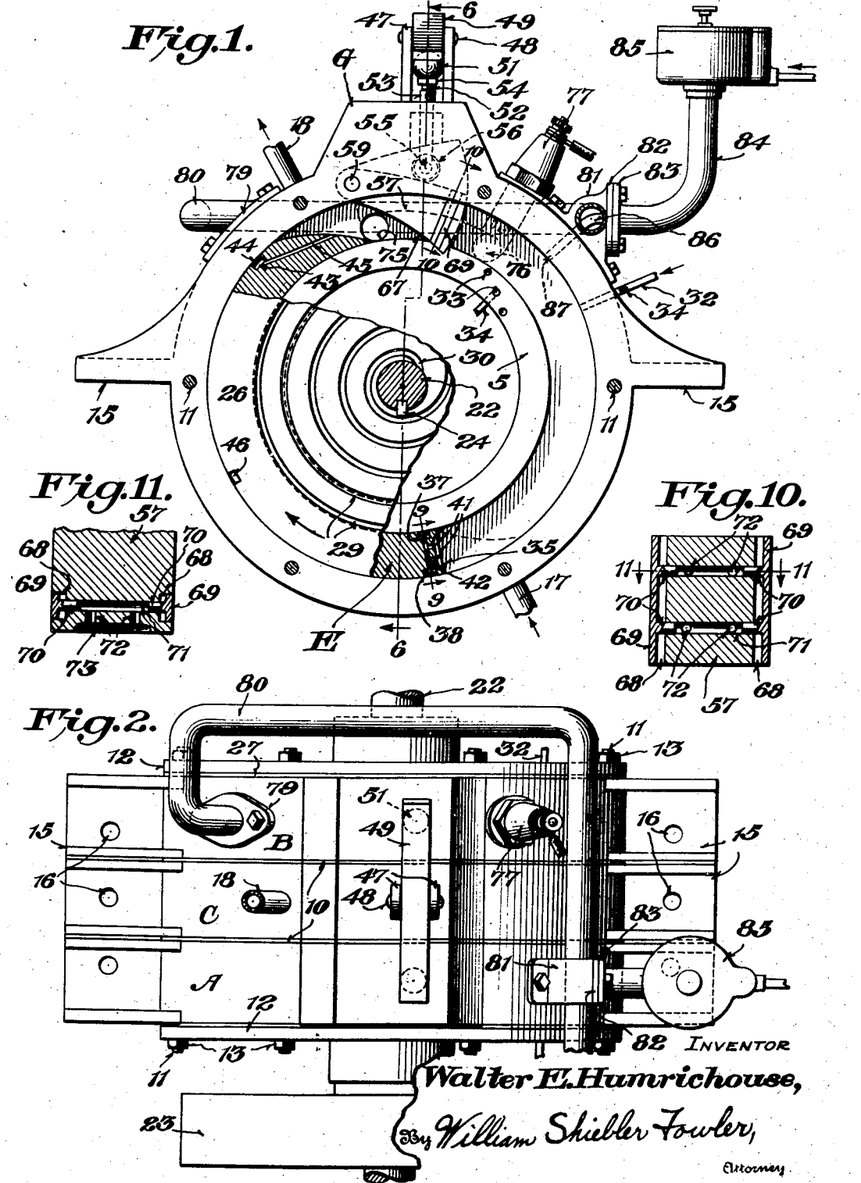
Figure 1 is a side elevation looking at the intake and compression side of the motor with the outer side plate or cover plate removed, parts broken away and parts in section and showing the arcuate charge compressing piston approaching the entrance end of the compression chamber to pass over and close the said entrance end just previous to actuating the co-operative lock-heads.
Figure 2 is a top plan view of the motor, with parts broken away.
Figure 10 is a further detail section, taken substantially on the plane of line 10—10 of Figure 1, transversely through the lock-head.
Figure 11 is a detail section longitudinally of the lock-head and taken substantially on the plane of line 11—11 of Figure 10.

The operation of the rotary motor is as follows: Before each combustible charge enters the continuous circular piston accommodating chamber 7 of the outwardly turned casing side section A, the lock head 57 therefor is firmly locked in its lowermost position with its lower edge 60 secured in the deep transverse, substantially V-shaped channel 61 in the continuous inner annular flange 5 thereof and the flat head 35 of the arcuate piston E is opposed to the convex head of said lock head 57. The rotary shaft 22 rotates in a clockwise direction thus, carrying the flat piston head 35 away from the lock head 57 and creating a partial vacuum therebetween, resulting in the sucking in of a generous combustible charge from the carburetter 85, into the said continuous circular piston accommodating chamber 7, from the time the charge intake port 87 is uncovered by passing of the said flat piston head 35 until the said charge intake port 87 is again covered and thereby closed by the long main portion of the said arcuate piston E. As the arcuate piston E occupies approximately one half of the continuous circular piston accommodating chamber 7 at all times, a new charge is steadily sucked into the latter during approximately one half of each revolution of the rotary shaft 22. From the time the tapering tail 36 of the arcuate piston E begins to pass the charge intake port 87 it begins to drive the fresh charge ahead of it around the continuous circular piston accommodating chamber 7, in a clockwise direction, driving the charge into the charge compression chamber 74 and thoroughly compressing it therein. This compression of the charge in the charge compression chamber 74 continues until the tapering tail 36 of the arcuate piston E passes over and completely closes the inlet opening or inlet end 75 of the charge compression chamber 74 and starts to slidably engage the longitudinally curved lower face 67 of the lock head 57 to raise the latter, slide beneath said lock head and continue in its steady travel around the continuous circular piston accommodating chamber 7. During compression in the charge compression chamber 74, the outlet or discharge end 76 thereof is covered over and thereby closed by the arcuate piston F in the continuous circular piston accommodating chamber 7 of the outwardly turned casing side section B; the lock head 57 for said outwardly turned casing side section B is in its uppermost position and the lock head 57 for the outwardly turned casing side section A is in its locked lowermost position, as shown in Figure 1 of the drawings. At completion of compression in the charge compression chamber 74 and positive closing of the inlet opening or inlet end thereof by the arcuate piston E, the flat head 35 of the arcuate piston F in the continuous circular piston accommodating chamber 7 of the outwardly turned casing side section B clears the convex head 62 of the lock head 57 under which it has just passed. Then, as the rotation of the rotary shaft 22 continues and the tapering tail 36 of the arcuate piston E raises the lock head 57 for the continuous circular piston accommodating chamber 7 of the outwardly turned casing side section A to pass therebeneath, the opposite lock head 57 for the continuous circular piston accommodating chamber 7 of the outwardly turned casing side section B is thereby automatically and simultaneously lowered to and locked in its lowermost position in said latter continuous circular piston accommodating chamber 7 with its convex head 62 presented opposite the flat head 35 of the arcuate piston F; the pairs of rollers 56 riding on the lock heads 57 and the stiff oil 63 or the like resting on said lock heads 57 giving double assurance of free yet positive operation of the lock heads together with one lowering as the other raises and vice versa. Now, we are ready for firing of the charge, with the latter at the height of its compression and this is accomplished by the spark plug 77, through proper timing of the ignition mechanism of the rotary motor, as the flat head 35 of the arcuate piston F clears the outlet or discharge end 76 of the charge compression chamber 74, thus firing the charge at the said outlet or discharge end of the charge compression chamber 74, within the continuous circular piston accommodating chamber 7 of the outwardly turned casing side section B, in the small space between the convex head 62 of the lock head 57 and the flat head 35 of the arcuate piston F with the full force of the explosion delivered directly to the latter to effectively drive the said arcuate piston F in a circle in the continuous circular piston accommodating chamber 7 in which it operates and thus drive the rotary shaft 22 of the rotary motor in its clockwise direction. As the arcuate piston F is being driven under the force of each new explosion of a fresh highly compressed combustible charge against the flat piston head 35, the tapering tail 36 of the arcuate piston F is clearing the continuous circular piston accommodating chamber 7 of all expended gases remaining therein from the previous firing, as the tapering tail 36 travels toward and passes the exhaust port 78. By the time the tapering tail 36 arrives at the longitudinally curved lower face 67 of the lock head 57 and slidably engages the latter, the old charge is completely cleared out from the continuous circular piston accommodating chamber 7 and the exhaust port 78 is covered and thereby closed by the main portion of the arcuate piston F, thus preventing mixing of expended gases with a new charge and resultant decrease in the efficiency of operation and power of the rotary motor, creation of carbon-monoxide and possibly other troubles or difficulties. As the arcuate piston F continues its travel around the continuous circular piston accommodating chamber of the outwardly turned casing side section B, the tapering tail 36 of the same slides along the longitudinally curved lower face of the lock head 57 and raises the latter to its uppermost position and again immediately starts to again drive newly expended gases around the continuous circular piston accommodating chamber toward the exhaust port 78 and completely clear said continuous circular piston accommodating chamber 7, by the time the tapering tail 36 arrives at the longitudinally curved lower face 67 of said lock head to repeat its engagement with the latter to again raise said lock head. Each time the arcuate piston F engages and raises this lock head 57 and passes under the same, the opposite lock head 57 is lowered to and retained in its locked lowermost position in the continuous circular piston accommodating chamber 7 of the outwardly turned casing side section A, through the medium of the pairs of rollers 56 with their cooperative connections and also the action of the stiff oil 63 on said lock heads 57. This reversal of positions of the lock heads 57 with respect to their respective outwardly turned casing side sections A and B, occurs immediately after the flat head 35 of the arcuate piston E clears the lock head 57 under which said arcuate piston E has just passed and begins to move away from the convex head of the same to create a suction by partial vacuum and then start to draw another generous charge into the continuous circular piston accommodating chamber of said outwardly turned casing side section A. At about this same time, the tapering tail 36 of the arcuate piston F moves across and thereby thoroughly closes the outlet or discharge end 76 of the charge compression chamber 74 for compression of the next charge which is then driven into and compressed in said charge compression chamber 74, by the tapering tail 36 of the arcuate piston E, as may now be apparent. While this rotary motor is complete in a single unit, all four phases of a complete cycle occur during each complete revolution of the rotary shaft 22; the first two phases, namely, intake and compression occurring in the outwardly turned casing side section A while the latter two phases, namely, firing and exhaust occur in the outwardly turned casing side section B and in each of said outwardly turned casing side sections A and B, two phases of the cycle occur therein simultaneously, during part of each complete revolution of the rotary shaft 22. Also, during part of each complete revolution of the rotary shaft 22, three phases of the cycle occur simultaneously, within the unit, namely, intake, firing and exhaust or intake, compression and exhaust, on successive charges. All gases within the unit act upon the various piston ring sections 37, 38, 69 for the arcuate pistons and the lock heads 57 to form gas seals therefor and thus prevent leakage of the gases around and pass said arcuate pistons E and F and the lock heads 57, during operation of the rotary motor. The speed of operation is increased or decreased, through advancing or retarding the spark, as in the conventional forms of internal combustion motors or engines now in general use and as all charges are preheated by the hot exhaust from the motor unit, before the charges enter the continuous circular piston chamber 7 of the outwardly turned casing side section A, the charges are thus thoroughly vaporized for high compression. Furthermore, as this single unit rotary motor is equivalent to the conventional two cylinder and some four cylinder internal combustion motors or engines, in operation, power and efficiency, the power and efficiency may be correspondingly increased as additional duplicate units are added onto the rotary shaft 22 in staggered relation and coupled in for operation together, as required or desired. The rotary motor may be just as efficiently operated as a steam motor, by removal of the spark plug 77, without requiring alteration in the construction of the rotary motor, from the form disclosed.

While I have disclosed what I consider to be the best embodiment of my invention. I desire it to be understood that changes in detail may be made without departing from the spirit of this invention and I therefore, desire further not to be limited beyond the requirements of the terms of my claims.

Having now fully described my invention, what I claim is:

1. A rotary motor including a casing stator with mounting means radiating from its sides; said casing stator having an open center and continuous circular piston chambers in opposite faces; cover plates for said opposite faces; a rotary power shaft operating in said cover plates and extending through the said open center of the said casing stator; disk rotors rigid on said rotary power shaft inwardly of said cover plates; arcuate pistons carried on said disk rotors and operable in said continuous circular piston chambers; said casing stator having an inner central water chamber between said continuous circular piston chambers; a charge compression chamber extending through said inner central water chamber and connecting the said continuous circular piston chambers; said last mentioned chambers having charge inlet and outlet openings closed at times by said arcuate pistons; lock heads for said continuous circular piston chambers and operable by said arcuate pistons; and operative connections between the said lock heads.

2. A rotary motor including a casing stator having outwardly turned casing side sections with inner and outer annular flanges forming opposite side walls of a pair of continuous circular piston chambers; outer cover plates for said outwardly turned casing side sections; said cover plates having hub portions; a rotary power shaft for said rotary motor journalled in said hub portions; a balance wheel for said rotary shaft; means between said casing side sections to retain them in spaced relation; said means having an inner central water chamber therein; a charge compression chamber extending at an angle through said water chamber and connecting said continuous circular piston chambers; said continuous circular piston chambers having inlet and outlet openings in walls thereof; mechanical and hydraulic lockheads for said continuous circular piston chambers; disk rotors carried on said rotary power shaft; arcuate pistons carried on said disk rotors and operating in said continuous circular piston chambers and slidable over said inlet and outlet openings and under said lock heads in the respective continuous circular piston chambers; and means for utilizing the hot exhaust gases of the rotary motor to preheat fresh charges before entry thereof into one of said continuous circular piston chambers.

3. A rotary motor including a casing stator having continuous circular piston chambers in opposite faces thereof and an open center; cover plates for said opposite faces; a rotary power shaft extended through said open center and journalled in said cover plates; a balance wheel for said rotary power shaft; disk rotors carried on said rotary power shaft inwardly of said cover plates; arcuate pistons carried on said disk rotors and operating in said continuous circular piston chambers; said arcuate pistons having flat heads and tapering tails at opposite ends; said arcuate pistons also having means provided therefor to assure fluid and gas tight engagement thereof with the walls of the respective continuous circular piston chambers at all times; said casing stator having a raised upper portion; lock heads within said raised upper portion and operable into said continuous circular piston chambers at times; means operable within said raised upper portion to control operation of said lock heads and assure locked engagement thereof with a wall of the respective continuous circular piston chambers at times; said lock heads having means provided therefor to assure fluid and gas tight engagement thereof with walls of the respective continuous circular piston chambers at all times when within the latter; said tapering tails of the said arcuate pistons having sliding engagement with the respective lock heads to raise the latter from within the said continuous circular piston chambers at times; a charge compression chamber between said continuous circular piston chambers; said arcuate pistons passing over and thereby closing the respective ends of said charge compression chamber at times; one of said continuous circular piston chambers having a charge intake port; the other continuous circular piston chamber having an exhaust port; means for firing compressed charges within the last mentioned continuous circular piston chamber; and means extended from the said exhaust port to provide for preheating of the charges before entry thereof by way of the said charge intake port.

4. A rotary motor complete in one unit for a full cycle during each rotation and including a casing stator having continuous circular piston chambers in opposed outwardly turned side sections; a rotary power shaft; a balance wheel for said rotary power shaft; cover plates for the opposed outwardly turned side sections of said casing stator; said cover plates having hub portions; mounting bearings within said hub portions for said rotary power shaft; disk rotors locked on said rotary power shaft inwardly of said cover plates; identical arcuate pistons carried on said disk rotors in opposed offset relation; each of said arcuate pistons operating in one of said continuous circular piston chambers in the same direction as if following one another; one of said continuous circular piston chambers having an intake port while the other has an exhaust port; a central compression chamber between said continuous circular piston chambers; said arcuate pistons closing said ports and the ends of the said compression chamber for predetermined periods and at predetermined intervals during each complete revolution of the said rotary power shaft by sliding over the same; co-operating lock heads for said continuous circular piston chambers; said arcuate pistons having tapering tails at one end for sliding engagement with the respective lock heads to move the latter out of the respective continuous circular piston chambers and permit said arcuate pistons to pass thereunder for approximately one half of each revolution of said rotary power shaft; means for controlling said lock-heads; a central water chamber between the opposed outwardly turned side sections of the said casing stator; means for firing compressed charges within the said continuous circular piston chamber having the exhaust port; and means for utilizing the hot exhaust gases from the rotary motor unit to preheat and thereby thoroughly vaporize the fresh charges before the latter enter the said intake port.

5. A single-rotation one-cycle motor including a casing stator formed in sections; the outer sections having inner and outer annular flanges forming side walls of continuous, circular piston chambers opening outwardly; the central section of the casing stator constituting an internal water chamber separating the said outer sections and situated between the continuous circular piston chambers; a rotary power shaft; disk rotors keyed on said rotary power shaft; arcuate pistons carried on the inner faces of said disk-rotors and operating in said continuous circular piston chambers; said arcuate pistons being opposed and offset from one another; pivoted lock-heads for said continuous circular piston-chambers; said arcuate pistons having tapering tails for sliding engagement with said pivoted lock heads to permit said arcuate pistons to pass beneath said pivoted lock heads; cover plates for said outer sections of the said casing stator; said rotary power shaft being journalled in said cover plates; one of said continuous circular piston chambers having a charge intake port in its outer side wall; the arcuate piston operating in this continuous circular piston chamber serving to suck in and compress a charge during each complete revolution of the said rotary power shaft; the other continuous circular piston chamber having an ignition member and an exhaust port in its outer side wall; the arcuate piston operating in said other continuous circular piston chamber serving to receive the full force of a charge ignited in said other continuous circular piston chamber and clear the latter of exhaust gases during each complete revolution of the said rotary power shaft; a charge compression chamber so arranged between said continuous circular piston chambers that the opening and closing thereof is controlled by said arcuate pistons; and a balance wheel for said rotary power shaft.

6. A rotary motor including a casing stator with an intake-compression piston chamber in one side and a firing-exhausting piston chamber in the other side; a charge compression chamber between the said piston chambers; the said intake-compression piston chamber having an intake port; said firing-exhaust piston chamber having an exhaust port; both of said piston chambers being of continuous circular form; cover plates for the sides of said casing stator; a rotary power shaft rotatable in said cover plates; disk-rotors on said rotary power shaft; lock heads for said piston chambers; arcuate pistons on the margins of the rotors and extending axially therefrom into said piston chambers, said pistons being adapted to slidably engage and pass said lock heads during each complete revolution of said rotary power shaft.

7. A motor including a casing-stator with an intake-compression piston chamber in one side and a firing-exhaust piston chamber in the other side; a charge compression chamber between the said piston chambers; the said intake-compression piston chamber having an intake port; said firing-exhaust piston chamber having an exhaust port; cover plates for the sides of said casing stator; a rotary power shaft rotatable in said cover plates; disk rotors on said rotary power shaft; said disk rotors having spiral oil suction grooves in their faces opposed to the said cover plates with the inner ends of said spiral grooves terminating at the said rotary power shaft to lubricate the latter during operation of the motor; means for supplying lubricating oil to said spiral grooves at all times; said rotors having their inner faces operating against said piston chambers; means for constantly lubricating said inner faces of the said disk rotors; lock heads for said piston chambers; pistons carried on marginal portions of the inner faces of said disk rotors and extending axially therefrom into said piston chambers; said pistons being adapted to slidably engage and pass said lock heads during each complete revolution of said rotary power shaft.

8. A one unit single-rotation one-cycle rotary motor including a casing-stator with an intake-compression piston chamber in one side and provided with an intake port; said casing-stator being provided with a firing-exhaust piston chamber in its other side having an exhaust port; a charge compression chamber between the said piston chambers; cover plates for the sides of said casing stator; a rotary power shaft rotatable in said cover plates; disk-rotors keyed on said rotary power shaft; lock-heads operable into said piston chambers; operative connections between said lock heads to assure uniform movement thereof in opposite directions when changing positions; one of said lock heads being in its lowermost locked position within one of said piston chambers while the other lock head is in its uppermost position above the other piston chamber; means for exerting hydraulic pressure on said lock heads to assure smooth movement thereof and positive retention of each of said lock heads when in its lowermost locked position; each of said lock heads having a longitudinally curved lower face; arcuate pistons carried on one face of said disk rotors and traveling in one direction in said piston chambers; said arcuate pistons having tapering tails for slidable engagement with the said longitudinally curved lower faces of said lock heads to raise the latter and permit passage of said arcuate pistons; and a balance wheel for said rotary power-shaft.

9. A one unit single-rotation one-cycle rotary motor including a casing-stator with an intake-compression piston chamber in one side and provided with an intake port; said casing stator being provided with a firing-exhaust piston chamber in its other side having an exhaust port; a charge compression chamber between the said piston chambers; cover plates for the sides of said casing stator; a rotary power shaft rotatable in said cover plates; disk rotors keyed on said rotary power shaft; said casing-stator having a raised central portion; lock heads pivoted in said raised central portion and operable into said piston chambers to assume lowermost locked positions therein; a rock arm mounted on said raised central portion of said casing stator; vertical rods working through the top of said raised central portion of said casing-stator; adjustable and slidable connections between said rock-arm and said vertical-rods; rollers carried on the lower ends of said vertical-rods within said raised central portion of said casing stator and riding on the upper faces of said lock-heads; one of said lock-heads being in its uppermost position while the other is in its lowermost locked position within said raised central portion; means for exerting hydraulic pressure on said lock-heads to assure smooth movement thereof and positive retention of each of said lock-heads when in its lowermost locked position; said lock-heads having longitudinally curved lower faces; arcuate pistons carried on the face of said disk rotors and traveling in one direction in said piston chambers; said arcuate pistons having tapering tails for slidable engagement with the said longitudinally curved lower faces of the respective lock-heads to raise the latter and permit passage of said arcuate pistons; and a balance-wheel for said rotary power-shaft.

10. A rotary motor comprising a rotatable shaft, a casing wall surrounding the shaft, an annular piston chamber in each end of the casing wall, rotors connected to the shaft, and arcuate pistons carried by and projecting axially from the rotors in opposite directions, said pistons being slidably disposed within said piston chambers, lock-heads for the piston chambers, means for operating the lock-heads, means for admitting an explosive charge to one of said piston chambers for compression therewithin, means for conveying the compressed charge to another of said piston chambers, and means for igniting the charge.

11. A rotary motor comprising a shaft, a casing wall surrounding the shaft, cover plates for the casing wall rotatably supporting the shaft, an annular piston chamber in each end of the casing wall, said chambers having sides opening towards said cover plates, rotors connected to the shaft, and arcuate pistons carried by and projecting axially from said rotors, said pistons being slidably disposed in said piston chambers, lock-heads for the piston chambers, means for operating the lock-heads, means for admitting an explosive charge to one of said piston chambers for compression therewithin, means for conveying the compressed charge to another of said piston chambers, and means for igniting the charge.

12. A rotary motor comprising a shaft, a casing wall surrounding the shaft, cover plates for the casing wall rotatably supporting the shaft, an annular piston chamber in each end of the casing wall, lock-heads for said chambers, means for operating the lock-heads, said chambers having sides opening towards said cover plates, rotors connected to the shaft, arcuate pistons carried by and projecting axially from said rotors, said pistons being slidably disposed in said piston chambers, and a water chamber in the casing wall between the piston chambers, adapted to receive water for cooling said chambers, means for admitting an explosive charge to one of said piston chambers, a charge compression chamber extending through the water chamber and connecting said piston chambers, means for igniting said explosive charge, and an exhaust leading from one of said piston chambers.

13. A rotary motor comprising a shaft, a casing wall surrounding the shaft, cover plates for the casing wall rotatably supporting the shaft, an annular piston chamber in each end of the casing wall, lock-heads for said piston chambers, said chambers having sides opening towards said cover plates, rotors connected to the shaft, arcuate pistons carried by and projecting axially from said rotors, said pistons being slidably disposed in said piston chambers, a water chamber in the casing wall between the piston chambers, and a compression chamber adapted to receive water for cooling said chambers, means for admitting an explosive charge to one of said piston chambers, a charge compression chamber extending through the water chamber and connecting said piston chambers, means for igniting said explosive charge, and an exhaust leading from one of said piston chambers.

14. A rotary motor comprising a shaft, a casing wall surrounding the shaft, cover plates for the casing wall rotatably supporting the shaft, an annular piston chamber in each end of the casing wall, lock-heads for the piston chambers, means for operating the lock-heads, said chambers having sides opening towards said cover plates, rotors connected to the shaft, and arcuate pistons carried by and projecting axially from said rotors, said pistons being slidably disposed in said piston chambers and at opposite sides of the shaft, means for admitting an explosive charge to one of said piston chambers for compression therewithin, means for conveying the compressed charge to another of the piston chambers, means for firing the compressed charge, and an exhaust for the last-named piston chamber.

15. A rotary motor comprising a shaft, a casing wall surrounding the shaft, cover plates for the casing wall rotatably supporting the shaft, an annular piston chamber in each end of the casing wall, said chambers having sides opening towards said cover plates, rotors connected to the shaft, arcuate pistons carried by and projecting axially from said rotors, said pistons being slidably disposed in said piston chambers and at diametrically opposite sides of the shaft, each of said pistons having a tapered end, and lock-heads for said piston chambers adapted to be raised by said tapered ends.

16. A rotary motor comprising a shaft, a casing wall surrounding the shaft, cover plates for the casing wall rotatably supporting the shaft, an annular piston chamber in each end of the casing wall, said chambers having sides opening towards said cover plates, rotors connected to the shaft, and an arcuate piston carried by and projecting axially from the inner face of each rotor and extending substantially half-way therearound, said pistons being slidably disposed in said piston chambers and at opposite sides of the shaft, lock-heads for the piston chambers, means for operating the lock-heads, means for admitting an explosive charge to one of said piston chambers for compression therewithin, means for conveying the compressed charge to another of said piston chambers, and means for igniting the explosive charge.

17. A rotary motor comprising a shaft, a casing wall surrounding the shaft, cover plates for the casing wall rotatably supporting the shaft, an annular piston chamber in each end of the casing wall, said chambers having sides opening towards said cover plates, rotors connected to the shaft, arcuate pistons carried by and projecting axially from said rotors, said pistons being slidably disposed in said piston chambers and at opposite sides of the shaft, each of said pistons having a tapered end, lock-heads for said piston chambers adapted to be raised by said tapered ends, and hydraulic means for urging one of said lock-heads into a piston chamber when another of said lock-heads is raised.

WALTER E. HUMRICHOUSE.